US011184373B2

(12) United States Patent
Lancioni et al.

(10) Patent No.: US 11,184,373 B2
(45) Date of Patent: Nov. 23, 2021

(54) CRYPTOJACKING DETECTION

(71) Applicant: McAfee, LLC, San Jose, CA (US)

(72) Inventors: German Lancioni, San Jose, CA (US);
Kunal Mehta, Hillsboro, OR (US);
Carl Woodward, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 181 days.

(21) Appl. No.: 16/059,640

(22) Filed: Aug. 9, 2018

(65) Prior Publication Data

US 2020/0053109 A1 Feb. 13, 2020

(51) Int. Cl.
*H04L 29/06* (2006.01)
*G06F 11/34* (2006.01)
*H04L 12/26* (2006.01)

(52) U.S. Cl.
CPC ...... *H04L 63/1425* (2013.01); *G06F 11/3409* (2013.01); *H04L 43/0876* (2013.01); *H04L 63/1416* (2013.01); *H04L 63/1441* (2013.01)

(58) Field of Classification Search
CPC ............. H04L 63/1425; H04L 63/1441; H04L 43/0876; H04L 63/1416; H04L 63/145; H04L 47/10; H04L 63/0227; G06F 11/3409; H04W 28/10; G10L 15/02
USPC ........................................................ 704/246
See application file for complete search history.

(56) References Cited

U.S. PATENT DOCUMENTS

| 8,959,022 | B2 * | 2/2015 | Cheng | G11B 27/105 |
| | | | | 704/270 |
| 2008/0162135 | A1 * | 7/2008 | Claudatos | H04L 63/30 |
| | | | | 704/243 |
| 2014/0196110 | A1 * | 7/2014 | Rubinstein | G06F 21/57 |
| | | | | 726/3 |
| 2015/0046161 | A1 * | 2/2015 | Locker | G09B 5/00 |
| | | | | 704/246 |
| 2016/0180239 | A1 * | 6/2016 | Frankel | G06K 9/00771 |
| | | | | 706/12 |
| 2016/0284355 | A1 * | 9/2016 | Makinen | G10L 19/008 |
| 2017/0046651 | A1 * | 2/2017 | Lin | G06Q 20/367 |
| 2017/0063904 | A1 * | 3/2017 | Muddu | H04L 63/1408 |
| 2017/0264627 | A1 * | 9/2017 | Hunt | G06F 21/577 |
| 2019/0364057 | A1 * | 11/2019 | Hazay | H04L 63/145 |
| 2020/0028867 | A1 * | 1/2020 | Monsen | H04L 63/1425 |

* cited by examiner

*Primary Examiner* — Abu S Sholeman
(74) *Attorney, Agent, or Firm* — Patent Capital Group

(57) ABSTRACT

There is disclosed in one example a computing apparatus, including: a processor; and logic encoded into one or more computer-readable mediums, the logic to instruct the processor to: capture first data from an intermediate data source across a first temporal interval; perform partial signal processing on the first data to classify the first temporal interval as either suspicious or not suspicious, wherein the first temporal interval is classified as suspicious if it is determined to potentially represent at least a portion of a cryptomining operation; classify second through N temporal intervals as either suspicious or not suspicious; based on the first through N temporal intervals, classify the apparatus as either operating a cryptomining function or not; and upon classifying the apparatus as operating a cryptomining function and determining that the cryptomining function is not authorized, take remedial action on the apparatus.

20 Claims, 10 Drawing Sheets

CRYPTOJACKING DETECTION

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
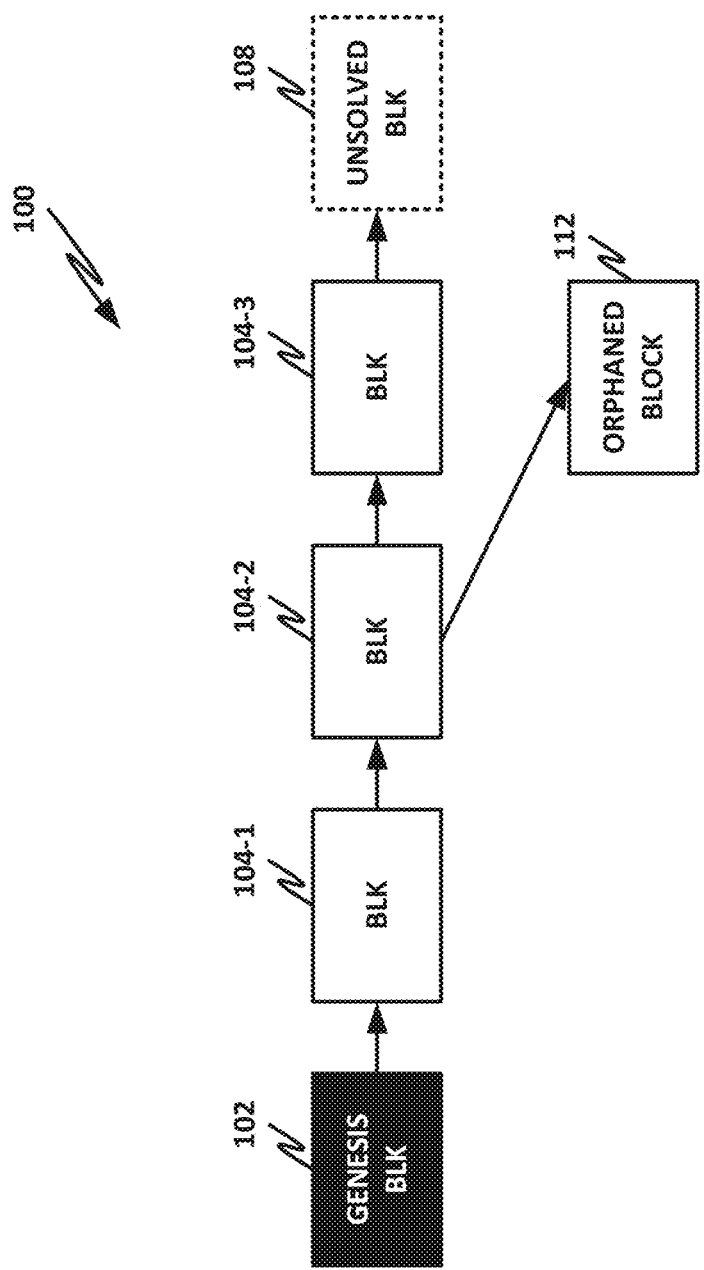
FIG. 1 is a block diagram illustrating features of a block chain.

In an example, there is disclosed a computing apparatus, including: a processor; and logic encoded into one or more computer-readable mediums, the logic to instruct the processor to: capture first data from an intermediate data source across a first temporal interval; perform partial signal processing on the first data to classify the first temporal interval as either suspicious or not suspicious, wherein the first temporal interval is classified as suspicious if it is determined to potentially represent at least a portion of a cryptomining operation; classify second through N temporal intervals as either suspicious or not suspicious; based on the first through N temporal intervals, classify the apparatus as either operating a cryptomining function or not; and upon classifying the apparatus as operating a cryptomining function and determining that the cryptomining function is not authorized, take remedial action on the apparatus.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A block chain is a cryptographic data structure that is used to help ensure the veracity of transactions. The block chain is a list of records called blocks, with each block being linked to the previous block cryptographically by a hash of the previous block. A block in a block chain can represent a particular transaction, and as the number of blocks increases, it becomes increasingly difficult to tamper with the block chain or to make changes to it, because it would be necessary to reverse engineer all of the linked hashes. Furthermore, many block chains use a so-called distributed ledger, in which copies of the ledger are openly and freely shared across the Internet. Thus, while it is possible for a person or entity to modify a particular transaction in the block chain, this modification is not credible unless the actor can convince a majority of entities that hold a copy of the distributed ledger to recognize modification.

While block chains are not theoretically unbreakable, they do provide substantial security by design, with high Byzantine fault tolerance (BFT). BFT describes the ability of nodes within a distributed computing environment (e.g., communicatively connected network servers, end-user devices, and applications, by way of nonlimiting example), to minimize or eliminate the impact of potentially misleading or destructive transaction information from bad actors operating mutually connected rogue nodes.

While many uses have been proposed for block chains, currently the most popular use of block chains is for so-called cryptocurrencies. The first known application of a block chain was invented by an anonymous actor named Satoshi Nakamoto, who created and released the source code for the cryptocurrency bitcoin.

Taking bitcoin as an illustrative example of a cryptocurrency, the advantages of a block chain can be seen. Bitcoins, or fractions of a bitcoin up to $1/100,000,000$th, can be exchanged via a peer-to-peer bitcoin network, without the need for intermediaries such as banks or governments. Transactions can be verified by network nodes via cryptography, and are then publicly recorded in the distributed ledger. Advantageously for many users, bitcoin transactions can be anonymous and instantaneous.

In cryptocurrencies such as bitcoin, the issue of scarcity is managed with so-called "mining." Those who mine cryptocurrencies maintain consistency within the block chain by repeatedly grouping new transactions into a block, and then transmitting the block to the network. The block can then be verified by recipient nodes. For the rest of the network to accept a new block, the new block must be accompanied by a so-called "proof of work" (POW). The proof of work requires the miner to solve a difficult mathematical problem. For example, bitcoin requires miners to find a number called a "nonce," so that when the contents of the block are hashed along with the nonce, the result is numerically smaller than a difficulty target set by the network. The block's header must be lower than or equal to the target in order for the block to be accepted.

In other words, the hash of a block must start with a certain number of zeros. The probability of calculating a hash that starts with many zeros is low, so many attempts must be made to calculate such a hash by brute force. To generate a new hash for the next round, the nonce value is incremented. As in many cryptography problems, the proof is easy or even trivial for a node in the network to verify, but difficult and time consuming to generate in the first instance. For a secure cryptographic hash, miners must try many different nonce values before meeting the difficulty target.

Because mining is a specific and very specialized problem, serious cryptocurrency miners may design custom application-specific integrated circuits (ASICs) to continuously solve the problem, and thus unlock new bitcoins. If done right, this can become a lucrative transaction. For example, as of this writing, a single bitcoin trades at approximately $8000 U.S. That value followed a generally upward trend starting with the founding of bitcoin up until approximately December 2017, when the value peaked at over $17,000. Since peaking, the cash value of bitcoin has shown signs of stabilizing, or at least following a more sinusoidal trajectory, similar to a traditional stock.

When cryptocurrencies, such as bitcoin by way nonlimiting example, are first released, mining new values is relatively trivial. But built into the source code of bitcoin is an algorithm to automatically adjust the difficulty of finding the nonce value so as to regulate the supply of new bitcoins. Thus, from the founding of bitcoin in 2009 to now, the number of bitcoins mined has increased quickly, while the number of bitcoins mined between now and 2140, when the last bitcoin is expected to be mined, will increase more gradually. Furthermore, as more and more bitcoins are discovered, the number of coins rewarded for each successful mine decreases. In general, the number of bitcoins awarded is expected to halve approximately every four years. In contrast, the bitcoin reward started at 50 bitcoins with the first successful mine in 2009, and halves every 210,000 blocks. Currently, the bitcoin reward is 12.5 bitcoins per successful mine. As the number of people mining increases, the difficulty of the mining task is increased, to help ensure that the bitcoin chain is not exhausted too quickly.

When sending a bitcoin, a fee must be paid by the users called a transaction fee. This provides an incentive for miners to include transactions in mined blocks. In essence, this creates a bidding war where the user who is willing to pay the highest processing fee is processed first. The processing fee goes to the miner, so the more congested the bitcoin network, the more money the miner earns. This amounts to an extra payment sent with any bitcoin transaction, calculated by subtracting the outputs of the transaction from the inputs of the transaction. Advantageously, as the block reward reduces over time, if the value of the bitcoin does not keep pace, then these fees can still provide an incentive for miners to continue mining.

Because the problem of mining new bitcoins is becoming increasingly difficult, and because mining is essentially a race to find the next bitcoin, individual, dedicated application-specific integrated circuits (ASICs) and field-programmable gate arrays (FPGAs) may not be up to the task. Rather, bitcoin mining pools are being formed in which contributors trade their spare compute cycles for a share in the eventually found bitcoin. Thus, a large number of users may pool their PCs, which often otherwise sit idle, to efficiently mine bitcoins. When a new bitcoin is found, the reward may then be divided among the contributors, for example, proportional to the number of cycles contributed to the mining effort.

This equitable approach to distributed mining has one obvious downside for the miner. He must share the rewards with those who share their compute cycles to solve the mining problem. Thus, some bad actors seek to perform distributed bitcoin or cryptocurrency mining without sharing the mined rewards. This gives rise to a relatively new attack known as "cryptojacking."

In cryptojacking, the attacker surreptitiously installs a background process on a user's machine, for example via one of the many known delivery mechanisms for viruses and other threats. Once this utility is installed, it steals processor cycles, and regularly communicates with a remote host, to help the cryptojacker find the next bitcoin. Once a bitcoin is located, the compromised node starts working on the next block.

As of this writing, there are over 700 known cryptocurrencies. With the proliferation of cryptocurrencies, cryptojacking has become an increasingly common threat that can compromise data centers, corporate or enterprise networks, and consumer devices. For example, in the year 2017, more than 2.7 million users experienced cryptojacking attacks, constituting a 50% increase over cryptojacking attacks in the year 2016.

Cryptojackers may employ several known techniques to steal compute resources. For example, cryptojacking may occur when a user visits a website that contains mining scripts that are executed by the browser. These types of cryptojacking attacks do not require installation of any software. On the other hand, some cryptojacking attacks employ standalone malware that is executed after infecting a system.

In the case of browser-based attacks, common browsers such as Opera, Firefox, Chrome, and Safari have implemented some mining detection technologies that identify cryptojacking JavaScript. Thus, browser-based attacks can be stopped at the source.

While the teachings of the present specification need not replace browser-based detection of malicious cryptojacking JavaScript, they can supplement those techniques. By way of nonlimiting example, a cryptojacking detection engine may be provided on a computing device as part of a comprehensive security or anti-malware suite.

The teaching of the present specification can detect unknown, ongoing cryptojacking operations in a system, and in particular may detect those that are beyond the scope of a browser. This can apply, for example, to a standalone cryptojacking malware executing in a server, host, or endpoint, regardless of whether it relies on installed malware, or is a so-called "fileless attack." A fileless attack is one that uses various persistent data sources on the computer, such as the registry hive, windows management instrumentation (WMI), environment variables, links or shortcuts, macros, scheduled tasks, cookies, or other entries, by way of nonlimiting example. In some cases, a fileless attack may also place some code in a persistent file, or may compromise a persistent file to provide a persistent load point.

The attack can then build a linked list of code fragments that can call each other and provide a complete executable without installing an easily detectable file.

Note that the embodiments discussed in the examples below focus on CPU-based cryptomining. This is provided as an illustrative example to teach the operative principles of the present specification. It should be understood that the teachings of the present specification are also applicable to other cryptojacking operations, such as hijacking of a graphics processing unit (GPU) or ASIC for cryptojacking purposes. In those embodiments, the CPU-based data sources described below may be replaced with GPU-based data sources, or ASIC-based data sources, and the teachings are otherwise substantially similar.

The cryptojacking detection engine disclosed herein correlates data from three main sources, namely per-process performance counters, network event traces, and dynamic disassembly analysis of running code. It may use these data sources to detect intervals belonging to a cryptomining pattern, regardless of the CPU threshold and mining pool server used. The pattern detection principle includes a recognition of the fact that currently a majority of cryptocurrency miners are based on the so-called stratum protocol to communicate with mining pools, and that proof of work iterations are often repetitive in nature. The cryptojacking detection engine described herein correlates data that may be treated and processed as a discrete audio signal, which can be analyzed to build up (interval by interval) the confidence level of the detection mechanism.

This provides advantages over existing solutions that are based on traditional and generic approaches for detecting cryptomining. For example, many existing approaches rely on signature-based technology present in traditional antivirus systems. While this is useful for detecting known cryptojacking infections, it is difficult or impossible for such systems to detect unknown or previously undetected cryptojacking malware. Thus, some cryptojacking malware authors may be able to bypass antivirus scanners with sophisticated kits that allow bad actors to produce their own versions of cryptomining malware, with customizations of the formulas used. Even minor variations in the deployment of such kits can defeat fingerprint or hash-based algorithms.

The teachings disclosed herein may also be supplemented with traditional network-based blocking solutions to stop mining-related communications. Many such network-based solutions rely on "obvious" patterns, such as the use of unauthorized ports or well-known mining pool server IPs. However, such network-based blocking solutions may be insufficient on their own, because as soon as a new or unknown cryptojacking operation is performed on an authorized port, via a proxy, and/or using an unknown mining pool server, the network-based blocking solution may fail.

Further, it should be noted that although many browsers already provide cryptojacking detection, such solutions may rely on resource usage detection to stop web scripts from consuming a significant amount of CPU resources. Although this can solve some browser-based attacks, it can sometimes be evaded by techniques such as browser extensions or background processes that continue to execute even after the browser is closed. Thus, even where browser-based detection is available, the teachings disclosed herein may be used to supplementally detect other hijacks, such as those that use an extension or a background process.

The cryptojacking detection engine disclosed herein detects an ongoing cryptojacking operation over time. This implies monitoring the system to eventually reach a sufficient detection confidence threshold. To reach this threshold, events from intermediate data sources may be consumed in intervals. The intermediate data sources may vary depending on the operating system and platform, but conceptually, these sources may be similar to event traces, performance counters, and dynamic disassembly analysis of running code. Event traces may include network data such as packet size, destination address, and destination port. Performance counter data may include percentage of processor utilization, I/O operations per second, page faults per second, and handlers count.

Dynamic disassembly can include disassembling of code pages of monitored applications to identify code or instruction sequences characteristic of cryptomining operations. Dynamic disassembly can be triggered, for example, by event or performance counters, and can be used to identify opcodes and assembly sequences or code flows that are normally present in a cryptojacking process.

In some embodiments, an interval duration may be configured to achieve either performance or accuracy. Intervals may be of substantially identical, or of variable lengths, to suit particular embodiments. For example, in experimental tests, a fixed interval duration of 10 seconds has been found to provide a good balance. Once the interval capture is complete, a discrete signal is generated based on the sequence of collected data. The discrete signal may have a plurality of dimensions according to events and counters collected. For each interval, the partial discrete signal may be analyzed as an audio-like signal, extracting properties such as average signal power, skew, kurtosis, and the autocorrelation vector of N lags. These properties may later be used as features of a micro-classifier that provides a partial or interval classification. For example, a process may be classified as 1, for "potential cryptojacking operation," or 0, for "standard system operation" or "non-cryptojacking operation."

The process may be repeated for N intervals, and once N partial classifications are obtained, a system status classification may be performed. The system status classification may use either a statistical approach or a machine learning method, by way of nonlimiting example. A confidence level may be computed to determine if the system is under the stress of a cryptojacking operation or not. For example, taking an interval duration of 10 seconds, after six intervals are captured, the system status may be classified. Thus, in this example, 60 seconds would be required to provide a high confidence cryptojacking classification.

A system and method for providing cryptojacking detection will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram illustrating features of a block chain 100.

Block chain 100 starts with genesis block 102. Block chain 100 may be maintained, for example, in an open ledger. It should be noted, however, that some block chains also use private ledgers.

Block chain 100 proceeds from genesis block 102 (the "root" node of the block chain) to a string of blocks 104, namely 104-1 through 104-N. An unsolved block 108 has not yet been added to the block chain. For example, unsolved block 108 may be the next coin available to be mined in a cryptocurrency. Thus, solving unsolved block 108 can grant the solver access to the cryptocurrency.

Taking bitcoin as an example, each block 104 may include fields such as a cache of the previous block, a timestamp, a nonce field, and a Merkle root. The Merkle root may contain hashes for verified transactions on the cryptocurrency. One feature of a block chain such as block chain 100 is that transactions or records may branch off from the main chain. These are illustrated in orphaned block 112. Although orphaned block 112 has the same structure as blocks 104, it exists outside of the longest series of transaction records starting at genesis block 102. Because the longest chain from genesis block 102 is considered to be the "best" or "valid" chain, orphaned blocks 112 are not considered part of the primary transaction chain. This represents a majority consensus, which requires the greatest amount of effort to produce or reproduce. This helps to prevent falsified records or "thefts" of cryptocurrencies. Note, however, that theft of cryptocurrency is not impossible, and has been successfully accomplished in the past.

As discussed above, solving unsolved block 108 gives the solver access to a new unit of cryptocurrency (such as a number of bitcoins). To compensate for the fact that compute power increases over time, and also that interest in a cryptocurrency may vary over time, the difficulty of finding a valid hash for unsolved block 108 and submitting the proof of work can be varied over time. For example, bitcoin currently varies the difficulty approximately every two weeks. If blocks are being generated too quickly, the difficulty can be increased so that more hashes are required to successfully solve a block and thus generate new bitcoins.

As discussed above, the difficulty in solving a bitcoin and the large number of compute resources necessary to solve a new bitcoin has led to the rise of so-called mining pools, in which users voluntarily and knowingly permit a miner to use their compute resources in exchange for some proportional share of the mined cryptocurrency. However, this has also given rise to an increase of cryptojacking attacks, in which bad actors hijack users' compute resources to mine cryptocurrency for themselves, without permission from the users. The system described herein includes a cryptojacking detection engine, which can be used to detect such attacks.

Figure 2:
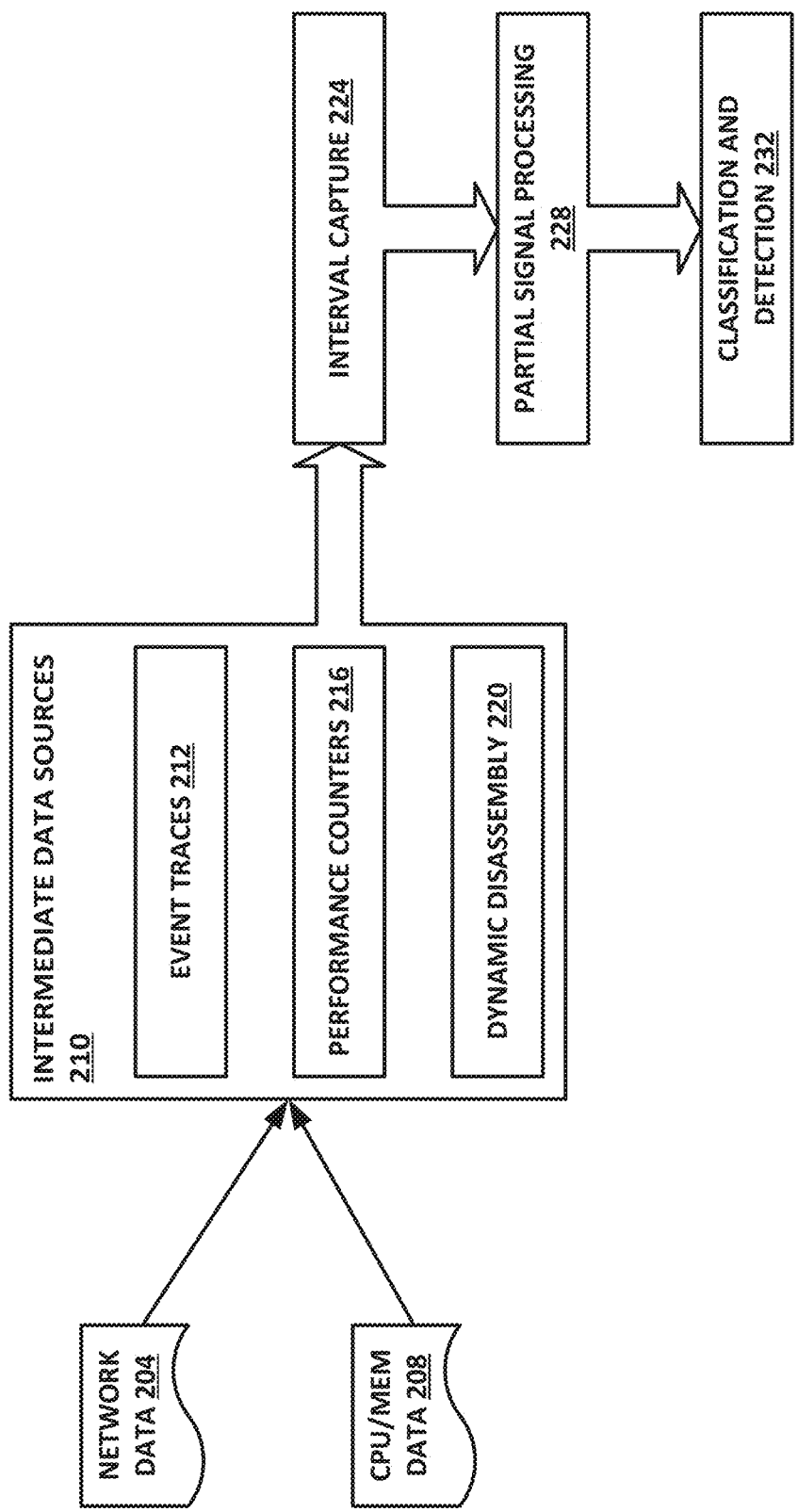
FIG. 2 is a block diagram illustrating a multistage cryptojacking detection engine.

FIG. 2 is a block diagram illustrating a multistage cryptojacking detection engine 200. In this example, cryptojacking detection engine 200 receives data that may be used to detect an ongoing cryptojacking operation. For example, cryptojacking detection engine 200 may rely on both network data 204 and CPU and memory data 208. Cryptojacking detection engine 200 compiles network data 204 and CPU and memory data 208 from intermediate data sources 210. Intermediate data sources 210 may be driven, for example, by system performance data such as event traces 212, performance counters 216, and dynamic disassembly 220 as described above. Event traces 212 and performance counters 216 may be driven in some examples by CPU performance enhancements, such as Intel® resource director technology (RDT) or similar.

Data culled from intermediate data sources 210 may be provided to an interval capture block 224, which analyzes data in the time domain across an interval, such as in 10 second blocks.

Captured intervals are processed in partial signal processing block 228, which may in some embodiments process the intervals similar to an audio signal.

Processed signals are then provided to classification and detection block 232, which can detect a potential ongoing cryptojacking operation and classify the operation as such.

Cryptojacking detection engine 200 may be provided, for example, as any combination of one or more logic elements that may be hosted on an appropriate hardware platform. The logic elements may be of similar or dissimilar species, operable for and configured to perform one or more methods provided by the engine. For example, an engine may include executable software that is to be executed on any species of processor, such as for example a microprocessor, digital signal processor, co-processor, or programmable logic device. The software may include one or more tangible, non-transitory computer-readable storage mediums having stored thereon instructions to instruct the processor to provide the method. Such a storage medium could include, by way of nonlimiting example, a hard disk drive, a volatile or nonvolatile memory, a read-only memory (ROM), basic input-output system (BIOS), a flash memory, a CD-ROM, a tape drive, or other memory. A non-transitory medium could also, in appropriate cases, include microcode within a microprocessor, or hardware instructions encoded directly into the semiconductor logic. A storage medium may also include a medium having stored thereon instructions that instruct a device to encode the logic within another device, such as Verilog or VHDL instructions, a mask work, or other logic to cause a device programmer to encode logic on a hardware onto a hardware device. The engine may also be embodied as an intellectual property (IP) block that can be seamlessly integrated into an integrated circuit (IC) as a "black box" with defined inputs, outputs, and functions.

In cases where an engine is embodied in software, the software may be a user space or root-level process that can be launched on any appropriate stimulus. For example, the software may be launched in response to receipt of a signal and/or in response to a user command. In other cases, the software may be a "daemon" process (whether implemented in hardware, software, firmware, or any combination thereof) that initiates at system startup or at another time and runs in the background. The engine may also be a terminate-and-stay-resident program, a service, system extension, control panel, bootup procedure, BIOS subroutine, or any similar program that operates without direct user interaction. In some embodiments, the engine may run with elevated non-root privileges in a "driver space" associated with ring 0, 1, or 2 in a protection ring architecture. It should also be noted that the engine may also include other hardware and software, including configuration files, registry entries, and interactive or user-mode software by way of nonlimiting example.

In cases where the engine is embodied at least partly in hardware other than the system processor, the hardware may include, by way of nonlimiting example, a co-processor, an FPGA, an ASIC, an IP block, a system-on-a-chip (SoC), or similar.

Figure 3:
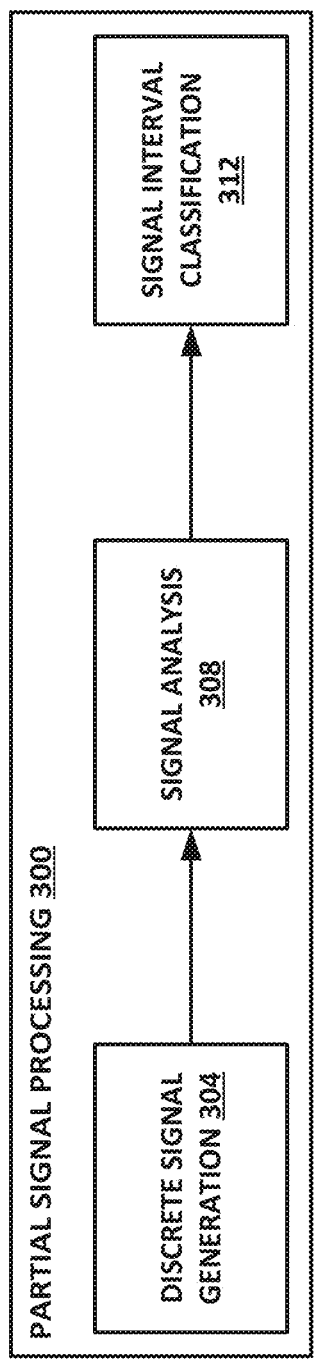
FIG. 3 is a block diagram illustrating a partial signal processing block.

FIG. 3 is a block diagram of partial signal processing block 300. Partial signal processing block 300 may in some embodiments be substituted for partial signal processing block 228 of cryptojacking detection engine 200 of FIG. 2. Partial signal processing block 300 is illustrated separately here to illustrate that it may be treated as a separate processing element, although in some embodiments it may also be a subroutine or sub-block of cryptojacking detection engine 200.

Partial signal processing block 300 may provide discrete signal generation. For example, an interval capture block, such as interval capture 224 of FIG. 2 may capture intermediate data across an interval. The interval duration may be configured to achieve either performance or accuracy as a trade-off. In experimental tests, an interval duration of 10 seconds has been found to provide a good balance.

Once the interval capture is complete, discrete signal generator 304 may generate a discrete signal based on the sequence of collected data. The discrete signal may have a plurality of dimensions, according to the events and counters collected.

For each interval, the partial discrete signal may be analyzed in signal analyzer 308. Signal analyzer 308 may analyze signals as an audio-like signal, and may extract properties such as average signal power, skew, kurtosis, and autocorrelation vector of N lags.

These properties may then be used by signal interval classifier 312 to classify the specific interval. The interval may be classified as potentially belonging to a cryptojacking operation, or as not belonging to a cryptojacking operation.

Figure 4:
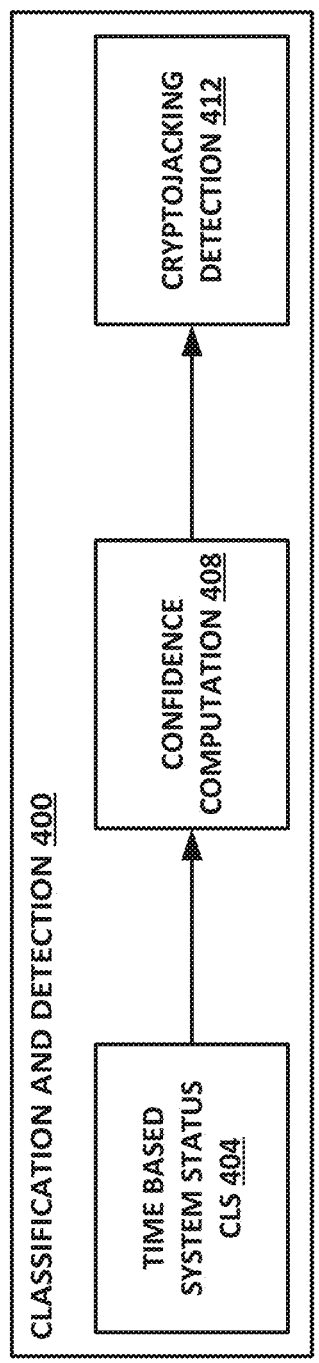
FIG. 4 is a block diagram illustrating a classification and detection block.

FIG. 4 is a block diagram of a classification and detection block 400. In various embodiments, classification and detection block 400 may be inserted for classification and detection block 232 of cryptojacking detection engine 200 of FIG. 2. Classification and detection block 400 is illustrated separately here to illustrate that it may be treated as a separate processing element, although in some embodiments it may also be a subroutine or sub-block of cryptojacking detection engine 200.

The partial signal processing of partial signal processing block 300 may be repeated N times for N intervals. Once N partial classifications are obtained, time-based system status classification block 404 may perform a status classification for the system as a whole. Time-based system status classifier 404 may use either a statistical approach or a machine learning method, by way of nonlimiting example.

A confidence computation 408 may then be performed to determine whether the system is under the stress of a cryptojacking operation. For example, if six discrete intervals are captured, with an interval duration of 10 seconds, then after 60 seconds, time-based system status classifier 404 may perform a system classification, and confidence computation block 408 may compute a confidence for the classification. Based on this confidence, cryptojacking detection block 412 either detects or does not detect a cryptojacking operation.

It should be observed that a cryptomining operation includes a plurality of phases that repeat over time. This includes, for example, an initial handshake with a mining pool server, a proof of work phase, and later communication to report results back and retrieve more data to process. Because the success of a cryptojacking operation depends in part on the amount of time that it is executed, it is expected that cryptomining will be running for relatively long periods of time. More mining equals more revenue for the miner. Thus, a classifier may be usefully trained to identify cryptomining-like behaviors. These can be identified using features based on the discrete signal generated from the interval data. These behaviors can be mapped to short-term cryptomining-like behaviors.

Note that a partial/interval classifier, such as partial signal processor 300 of FIG. 3, is not necessarily expected to identify a cryptojacking operation on its own. Rather, partial signal processor 300 is intended to classify individual intervals as suspicious or not. If a benign or authorized process is behaving like a cryptomining process, it is anticipated that this behavior would appear periodically or occasionally rather than permanently during the process lifecycle. Thus, system status classifier 404 of FIG. 4 computes an overall conclusion, taking into consideration all of the intervals classified.

Classification can be accomplished in a cascade classification manner. Although multiple dimensions may be analyzed, by way of illustration, the following example illustrates two dimensions that may be analyzed to detect a cryptojacking operation.

When a cryptomining process starts in the system, some of the signal intervals may be flagged as suspicious. After processing a minimum number of intervals, a confidence level is computed to determine the overall status of the system, which may translate into a cryptojacking detection score. This is illustrated in the graph of FIG. 5.

Figure 5:
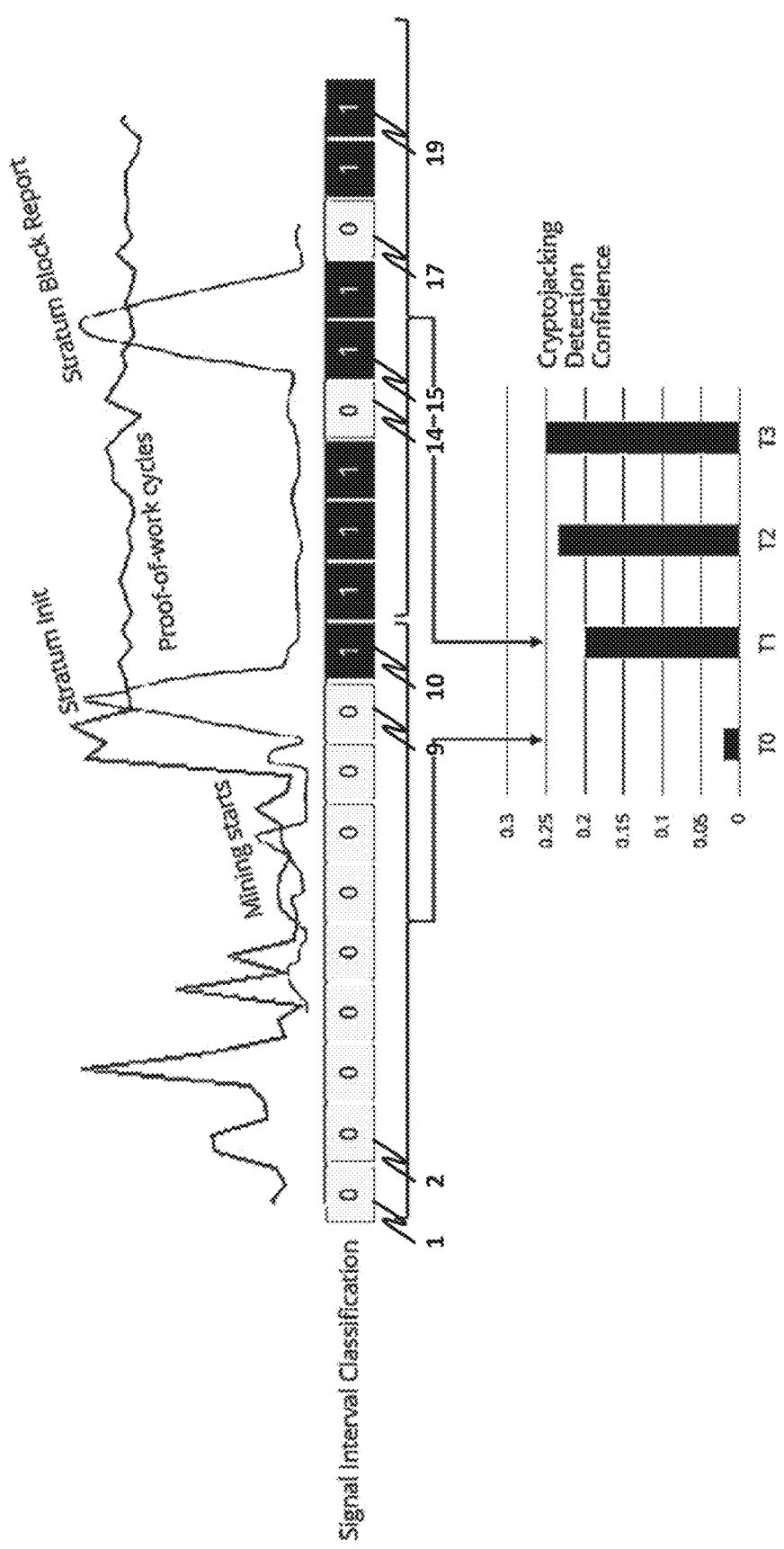
FIG. 5 graphically illustrates detection of a cryptomining operation.

FIG. 5 graphically illustrates detection of a cryptomining operation. In this example, detection is based on two factors, namely network data and CPU/memory data. As illustrated in FIG. 5, during the first nine intervals, no suspicious behavior is detected. Thus, the first nine intervals are marked as non-suspicious. However, the mining operation may actually start at approximately block 7 or 8. Through block 9, CPU and network usage appear to follow an ordinary usage pattern. But starting in block 8, there is a large spike in CPU usage. This large spike in CPU usage continues through block 19. Furthermore, the increase of CPU usage is followed in block 9 by a burst of network activity. If the potential cryptomining operation is using the "stratum" algorithm, which is a protocol that has been extended to support pooled mining, this burst of network activity could represent a stratum initialization (INIT) operation. Thus, after detecting a spike in CPU and memory usage followed by a quick burst of network activity, potential cryptomining behavior is detected in block 10. In blocks 10 through 13, the high CPU utilization continues, while low network usage also continues. This may be indicative of a cryptomining node that is working on a mining operation, but has not yet found a proof of work to submit.

By block 14, there is a slight dip in CPU usage, which is somewhat uncharacteristic of cryptomining. So, block 14 is characterized as non-suspicious. But block 14 is followed by block 15, in which CPU usage ticks back up, while there is another burst of network activity. This may be, for example, a stratum block report, or even a proof of work if the node has successfully "mined" a bitcoin. Thus, blocks 15 and 16, where the stratum block report or proof of work is provided, are marked as suspicious. Block 17 is again marked as non-suspicious, because the unusual network activity subsides. However, blocks 18 and 19 may be marked as suspicious because of the continuation of high CPU usage with low network usage after the burst.

Note that none of the individual blocks illustrated herein are necessarily used to identify a cryptojacking attack. Rather, the observed behavior between blocks 10 and 19 can be used to classify that group of blocks as a potential cryptojacking attack. If the unusual behavior continues, then the confidence in this classification may increase. Furthermore, if the behavior subsides but recurs at regular or irregular intervals, then the confidence that a cryptojacking attack has occurred may also increase.

Note that the behavioral detection illustrated herein may also be combined with dynamic disassembly of running code. This may include checking whether the code of monitored processes tracks with the code of a suspicious cryptojacking-type process. Cryptomining tends to reproduce a well-defined cycle that repeats itself when computing proof of work. Based on this observation, the dynamic disassembly and analysis of the present disclosure may attempt to discover operations involved in hash algorithms via dynamic analysis of running code.

Dynamic disassembly may further be used to complement the previously described use of intermediate data sources. Dynamic disassembly can be used to increase the confidence of classification of a process as a cryptojacking process, as illustrated in confidence computation 408 of FIG. 4. This can be achieved by dynamically disassembling monitored process code, triggered by event or configured performance counter overflows. The system can then look into the opcodes and assembly sequences to see if these opcodes and assembly sequences resemble a long-running, repeated computation heavy code path.

Figure 6:
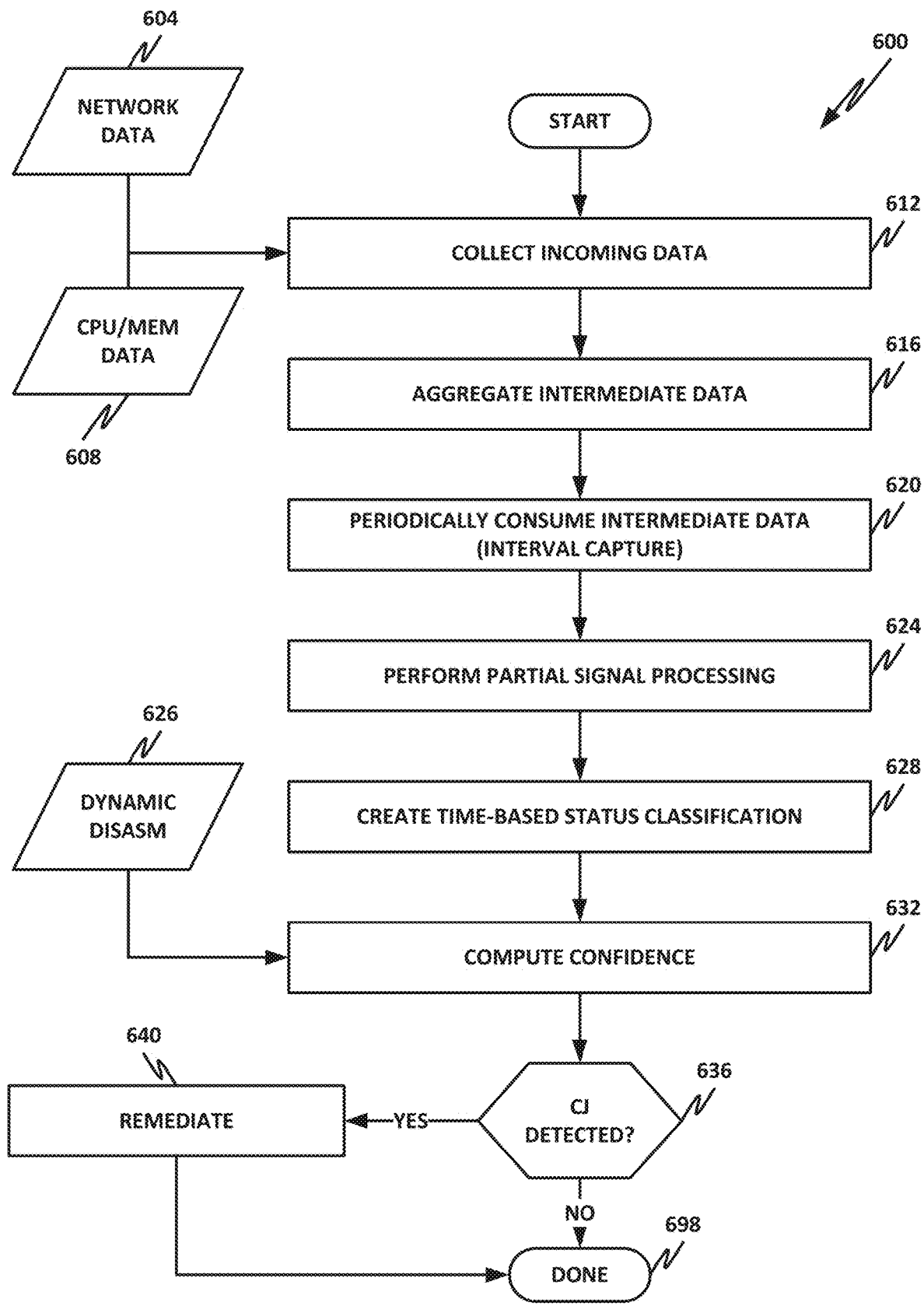
FIG. 6 is a flowchart illustrating a method of performing cryptojacking detection.

FIG. 6 is a flowchart illustrating a method 600 of performing cryptojacking detection.

Method 600 includes a plurality of data sources or dimensions, including in this illustrative example network data 604 and CPU/memory data 608. In block 612, the system collects incoming data such as network data 604 and CPU/memory data 608.

Based on performance counters, event traces, and dynamic disassembly, these data are aggregated into intermediate data.

In block 620, interval capture occurs, in which the system periodically consumes the intermediate data. For example, the interval may be 10 seconds or some other value, and the data may be consumed across this interval.

In block 624, partial signal processing may be performed, such as is illustrated in partial signal processor 300 of FIG. 3.

In block 628, the system may create a time-based system status and classification as illustrated in classifier and detector 400 of FIG. 4. This status or classification may result in determining either that the system is currently under a cryptojacking attack, or is not.

In block 632, a confidence of this prediction may be computed. The confidence may be informed as illustrated above, not only by the length or recurrence of an alleged cryptojacking operation, but also by dynamic disassembly 626.

In decision block 636, the system determines whether a cryptojacking operation has been identified with confidence above a given confidence threshold. If a cryptojacking operation is detected, then in block 640, the system may perform remediation.

Remediation may include performing a full or comprehensive antivirus scan, notifying an enterprise network operator, accessing a threat intelligence database, or taking other remedial steps to stop a cryptojacking operation. Furthermore, in some embodiments, it may be useful to perform notification to a user to determine whether the cryptomining operation is authorized. For example, if the operator is part of a cryptomining pool, then the system may detect a cryptomining operation that does not represent cryptojacking because it is authorized. In that case, the process that is performing the cryptomining may be flagged as authorized, and may be permitted to execute. If the user indicates that he or she is not part of a cryptomining pool, then the cryptomining process may be marked as illegitimate and may be deemed a cryptojacking operation.

Figure 7:
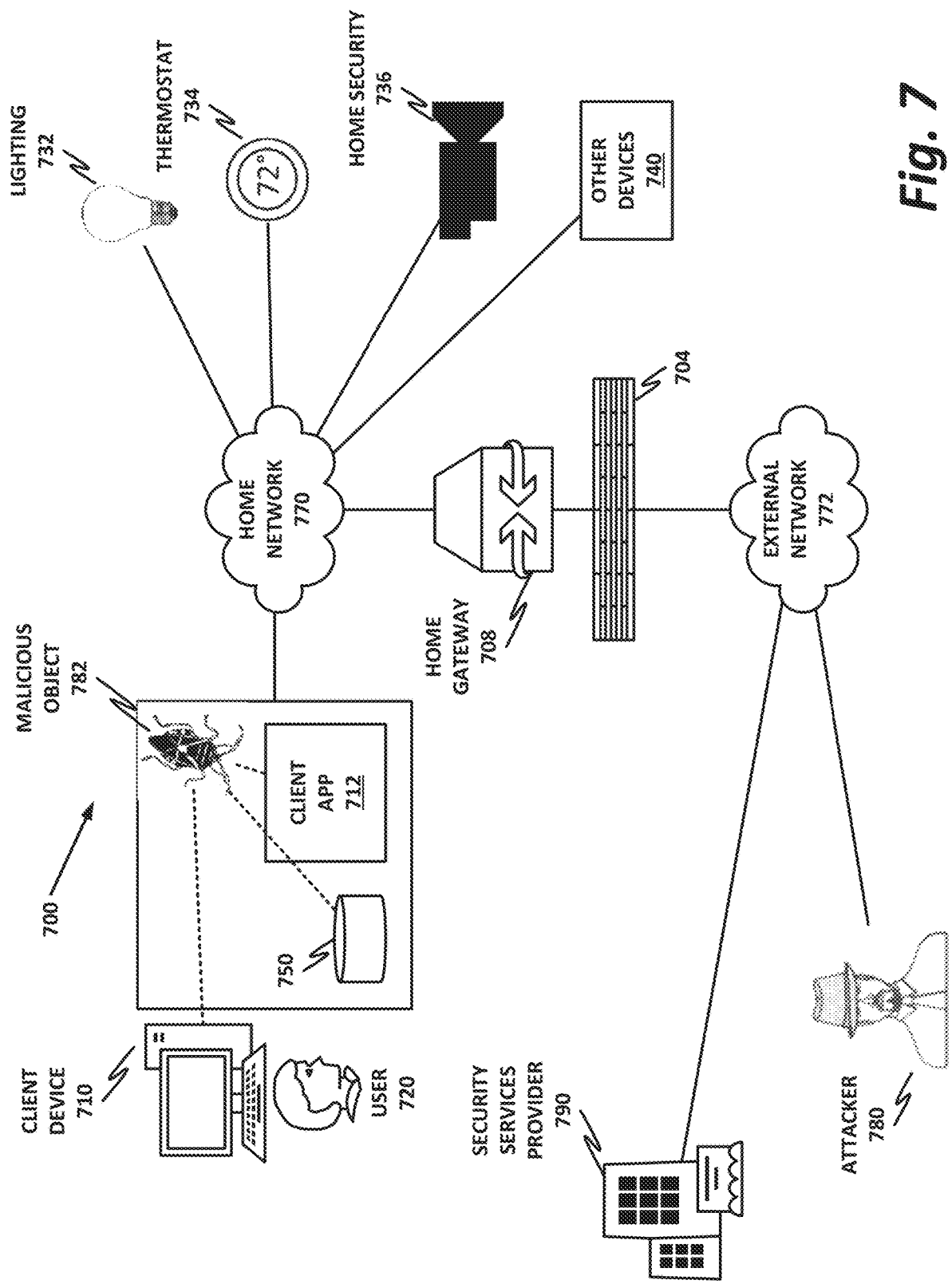
FIG. 7 is a block diagram of a home network.

FIG. 7 is a block diagram of a home network 700. Embodiments of home network 700 disclosed herein may be adapted or configured to provide the method of cryptojacking detection according to the teachings of the present specification. In the example of FIG. 7, home network 700 may be a "smart home" with various Internet of things (IoT) devices that provide home automation or other services. Home network 700 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 700, one or more users 720 operate one or more client devices 710. A single user 720 and single client device 710 are illustrated here for simplicity, but a home or enterprise may have multiple users, each of which may have multiple devices.

Client devices 710 may be communicatively coupled to one another and to other network resources via home network 770. Home network 770 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 770 may also include one or more servers, firewalls, routers, switches, security appliances, antivirus servers, or other network devices, which may be single-purpose appliances, virtual machines, containers, or functions running on client devices 710.

In this illustration, home network 770 is shown as a single network for simplicity, but in some embodiments, home network 770 may include any number of networks, such as one or more intranets connected to the Internet. Home network 770 may also provide access to an external network, such as the Internet, via external network 772. External network 772 may similarly be any suitable type of network.

Home network 770 may connect to the Internet via a home gateway 708, which may be responsible, among other things, for providing a logical boundary between home network 772 and external network 770. Home network 770 may also provide services such as dynamic host configuration protocol (DHCP), gateway services, router services, and switching services, and may act as a security portal across home boundary 704.

Home network 700 may also include a number of discrete IoT devices, which in contemporary practice are increasing regularly. For example, home network 700 may include IoT functionality to control lighting 732, thermostats or other environmental controls 734, a home security system 736, and any number of other devices 740. Other devices 740 may include, as illustrative and nonlimiting examples, network attached storage (NAS), computers, printers, smart televisions, smart refrigerators, smart vacuum cleaners and other appliances, and network connected vehicles.

Home network 700 may communicate across home boundary 704 with external network 772. Home boundary 704 may represent a physical, logical, or other boundary. External network 772 may include, for example, websites, servers, network protocols, and other network-based services. In one example, an attacker 780 (or other similar malicious or negligent actor) also connects to external network 772. A security services provider 790 may provide services to home network 700, such as security software, security updates, network appliances, or similar. For example, McAfee, Inc. provides a comprehensive suite of security services that may be used to protect home network 700.

It may be a goal of users 720 and home network 700 to successfully operate client devices 710 and IoT devices without interference from attacker 780 or from unwanted security objects. In one example, attacker 780 is a malware author whose goal or purpose is to cause malicious harm or mischief, for example, by injecting malicious object 782 into client device 710. According to embodiments of the present specification, malicious object 782 may include a fileless attack or a living off the land attack. Fileless attacks or living off the land attacks may be considered security threats or attacks, by way of nonlimiting example. Once malicious object 782 gains access to client device 710, it may try to perform work such as social engineering of user 720, a hardware-based attack on client device 710, modifying storage 750 (or volatile memory), modifying client application 712 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 780 to leverage against home network 770.

Malicious harm or mischief may take the form of installing root kits or other malware on client devices 710 to tamper with the system, installing spyware or adware to collect personal and commercial data, defacing websites, operating a botnet such as a spam server, or simply to annoy and harass users 720. Thus, one aim of attacker 780 may be to install his malware on one or more client devices 710 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 780 may also want to commit industrial or other espionage, such as stealing classified or proprietary data, stealing identities, or gaining unauthorized access to enterprise resources. Thus, attacker 780's strategy may also include trying to gain physical access to one or more client devices 710 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 780. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 700 may contract with or subscribe to a security services provider 790, which may provide security services, updates, antivirus definitions, patches, products, and services. McAfee®, Inc. is a nonlimiting example of such a security services provider that offers comprehensive security and antivirus solutions. In some cases, security services provider 790 may include a threat intelligence capability such as the global threat intelligence (GTI™) database provided by McAfee Inc. Security services provider 790 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 8:
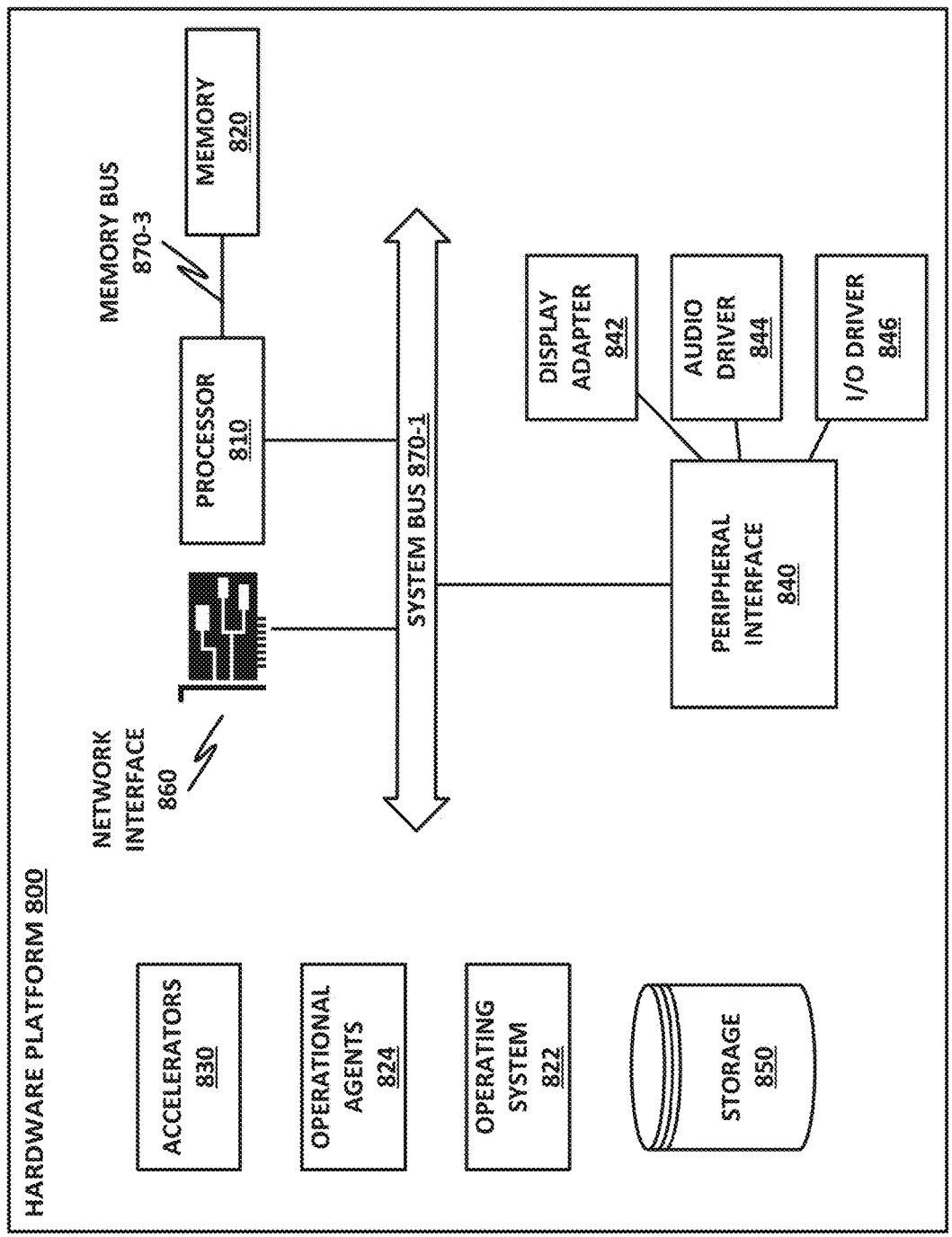
FIG. 8 is a block diagram of a hardware platform.

FIG. 8 is a block diagram of hardware platform 800. Embodiments of hardware platform 800 disclosed herein may be adapted or configured to provide the method of cryptojacking detection according to the teachings of the present specification. Hardware platform 800 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices 810, home gateway 808, and the IoT devices illustrated in FIG. 8 may all be examples of devices that run on a hardware platform such as hardware platform 800. FIG. 8 presents a view of many possible elements that may be included in a hardware platform, but it should be understood that not all of these are necessary in every platform, and platforms may also include other elements. For example, peripheral interface 840 may be an essential component in a user-class device to provide input and output, while it may be completely unnecessary in a virtualized server or hardware appliance that communicates strictly via networking protocols.

By way of illustrative example, hardware platform 800 provides a processor 810 connected to a memory 820 and other system resources via one or more buses, such a system bus 870-1 and a memory bus 870-3.

Other components of hardware platform 800 include a storage 850, network interface 860, and peripheral interface 840. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 820 and storage 850, for example, in a single physical memory device, and in other cases, memory 820 and/or storage 850 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 860 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 810 may be treated as only one core of a multi-core processor, or may be treated as the entire multi-core processor, as appropriate. In some embodiments, one or more co-processors may also be provided for specialized or support functions.

Processor 810 may be communicatively coupled to devices via a system bus 870-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 870-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 810 is communicatively coupled to memory 820 via memory bus 870-3, which may be, for example, a direct memory access (DMA) bus, though other memory architectures are possible, including ones in which memory 820 communicates with processor 810 via system bus 870-1 or some other bus. In the same or an alternate embodiment, memory bus 870-3 may include remote direct memory access (RDMA), wherein processor 810 accesses disaggregated memory resources via DMA or DMA-like interfaces.

To simplify this disclosure, memory 820 is disclosed as a single logical block, but in a physical embodiment may include one or more blocks of any suitable volatile or nonvolatile memory technology or technologies, including, for example, double data rate random access memory (DDR RAM), static random access memory (SRAM), dynamic random access memory (DRAM), persistent random access memory (PRAM), or other similar persistent fast memory, cache, Layer 1 (L1) or Layer 2 (L2) memory, on-chip memory, registers, flash, ROM, optical media, virtual memory regions, magnetic or tape memory, or similar. In certain embodiments, memory 820 may comprise a relatively low-latency volatile main memory, while storage 850 may comprise a relatively higher-latency nonvolatile memory. However, memory 820 and storage 850 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 850 may be any species of memory 820, or may be a separate device. Storage 850 may include one or more non-transitory computer-readable mediums, including, by way of nonlimiting example, a hard drive, solid-state drive, external storage, microcode, hardware instructions, redundant array of independent disks (RAID), NAS, optical storage, tape drive, backup system, cloud storage, or any combination of the foregoing. Storage 850 may be, or may include therein, a database or databases or data stored in other configurations, and may include a stored copy of operational software such as operating system 822 and software portions, if any, of operational agents 824, accelerators 830, or other engines. Many other configurations are also possible, and are intended to be encompassed within the broad scope of this specification.

As necessary, hardware platform 800 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 800 may be configured for virtualization or containerization, in which case it may also provide a hypervisor, virtualization platform, virtual machine manager (VMM), orchestrator, containerization platform, or other infrastructure to provide flexibility in allocating resources.

Network interface 860 may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 824 are one or more computing engines that may include one or more non-transitory computer-readable mediums having stored thereon executable instructions operable to instruct a processor to provide operational functions. At an appropriate time, such as upon booting hardware platform 800 or upon a command from operating system 822 or a user or security administrator, processor 810 may retrieve a copy of operational agents 824 (or software portions thereof) from storage 850 and load it into memory 820. Processor 810 may then iteratively execute the instructions of operational agents 824 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, an FPGA programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 840 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 842, audio driver 844, and input/output (I/O) driver 846. Display adapter 842 may be configured to provide a human-readable visual output, such as a command-line interface (CLI) or graphical desktop such as Microsoft Windows, Apple OSX desktop, or a Unix/Linux X Window System-based desktop. Display adapter 842 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 842 may include a hardware graphics card, which may have its own memory and its own graphics processing unit (GPU). Audio driver 844 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 9:
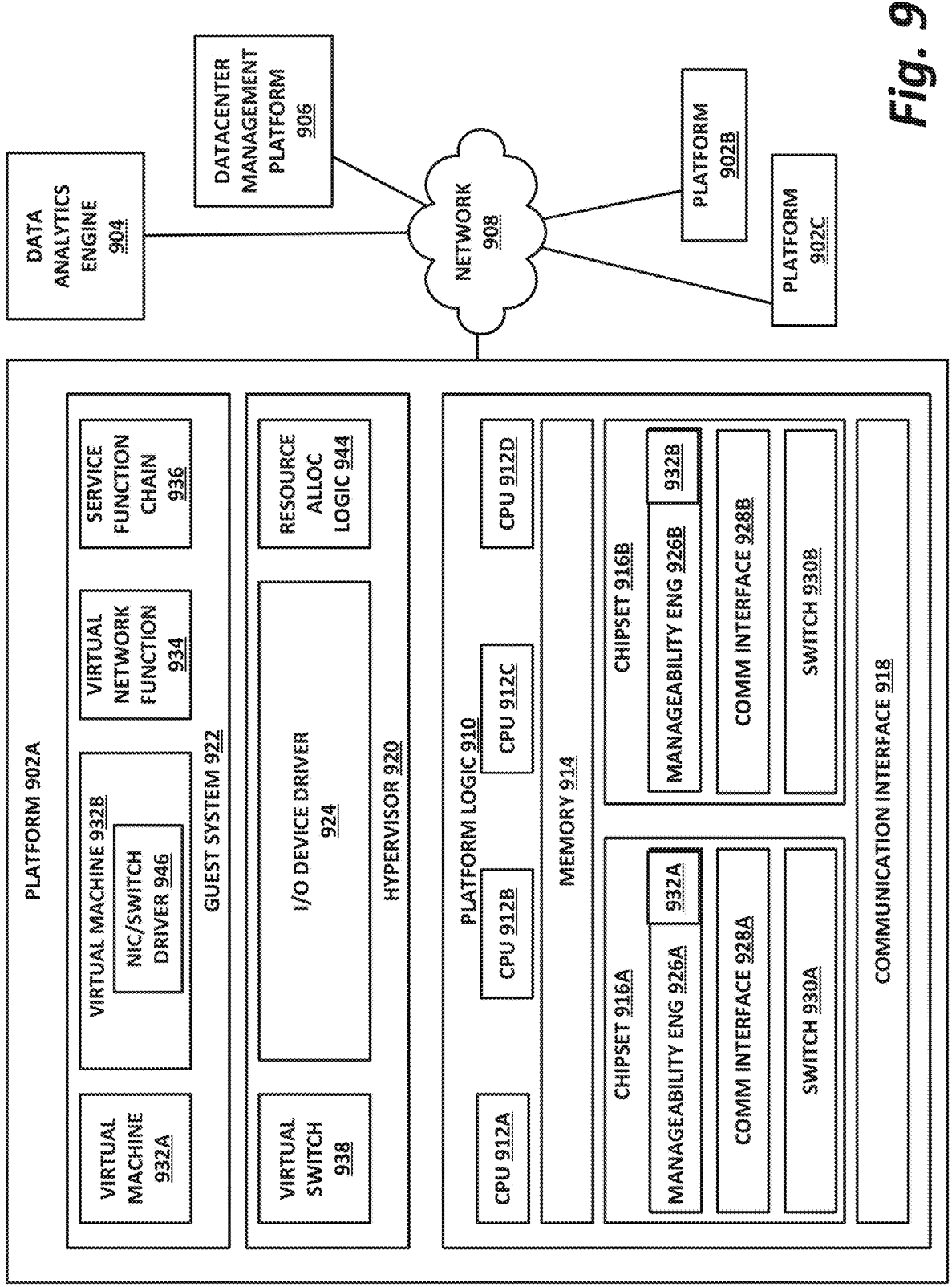
FIG. 9 is a block diagram of components of a computing platform.

FIG. 9 is a block diagram of components of a computing platform 902A. Embodiments of computing platform 902A disclosed herein may be adapted or configured to provide the method of cryptojacking detection according to the teachings of the present specification. In the embodiment depicted, platforms 902A, 902B, and 902C, along with a data center management platform 906 and data analytics engine 904 are interconnected via network 908. In other embodiments, a computer system may include any suitable number (i.e., one or more) of platforms. In some embodiments (e.g., when a computer system only includes a single platform), all or a portion of the system management platform 906 may be included on a platform 902. A platform 902 may include platform logic 910 with one or more central processing units (CPUs) 912, memories 914 (which may include any number of different modules), chipsets 916, communication interfaces 918, and any other suitable hardware and/or software to execute a hypervisor 920 or other operating system capable of executing workloads associated with applications running on platform 902. In some embodiments, a platform 902 may function as a host platform for one or more guest systems 922 that invoke these applications. Platform 902A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an IoT environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 906, hypervisor 920, or other operating system) of computer platform 902A may assign hardware resources of platform logic 910 to perform workloads in accordance with the stress information. In some embodiments, self-diagnostic capabilities may be combined with the stress monitoring to more accurately determine the health of the hardware resources. Each platform 902 may include platform logic 910. Platform logic 910 comprises, among other logic enabling the functionality of platform 902, one or more CPUs 912, memory 914, one or more chipsets 916, and communication interfaces 928. Although three platforms are illustrated, computer platform 902A may be interconnected with any suitable number of platforms. In various embodiments, a platform 902 may reside on a circuit board that is installed in a chassis, rack, or other suitable structure that comprises multiple platforms coupled together through network 908 (which may comprise, e.g., a rack or backplane switch).

CPUs 912 may each comprise any suitable number of processor cores and supporting logic (e.g., uncores). The cores may be coupled to each other, to memory 914, to at least one chipset 916, and/or to a communication interface 918, through one or more controllers residing on CPU 912 and/or chipset 916. In particular embodiments, a CPU 912 is embodied within a socket that is permanently or removably coupled to platform 902A. Although four CPUs are shown, a platform 902 may include any suitable number of CPUs.

Memory 914 may comprise any form of volatile or nonvolatile memory including, without limitation, magnetic media (e.g., one or more tape drives), optical media, RAM, ROM, flash memory, removable media, or any other suitable local or remote memory component or components. Memory 914 may be used for short, medium, and/or long term storage by platform 902A. Memory 914 may store any suitable data or information utilized by platform logic 910, including software embedded in a computer-readable medium, and/or encoded logic incorporated in hardware or otherwise stored (e.g., firmware). Memory 914 may store data that is used by cores of CPUs 912. In some embodiments, memory 914 may also comprise storage for instructions that may be executed by the cores of CPUs 912 or other processing elements (e.g., logic resident on chipsets 916) to provide functionality associated with the manageability engine 926 or other components of platform logic 910. A platform 902 may also include one or more chipsets 916 comprising any suitable logic to support the operation of the CPUs 912. In various embodiments, chipset 916 may reside on the same die or package as a CPU 912 or on one or more different dies or packages. Each chipset may support any suitable number of CPUs 912. A chipset 916 may also include one or more controllers to couple other components of platform logic 910 (e.g., communication interface 918 or memory 914) to one or more CPUs. In the embodiment depicted, each chipset 916 also includes a manageability engine 926. Manageability engine 926 may include any suitable logic to support the operation of chipset 916. In a particular embodiment, a manageability engine 926 (which may also be referred to as an innovation engine) is capable of collecting real-time telemetry data from the chipset 916, the CPU(s) 912 and/or memory 914 managed by the chipset 916, other components of platform logic 910, and/or various connections between components of platform logic 910. In various embodiments, the telemetry data collected includes the stress information described herein.

In various embodiments, a manageability engine 926 operates as an out-of-band asynchronous compute agent which is capable of interfacing with the various elements of platform logic 910 to collect telemetry data with no or minimal disruption to running processes on CPUs 912. For example, manageability engine 926 may comprise a dedicated processing element (e.g., a processor, controller, or other logic) on chipset 916, which provides the functionality of manageability engine 926 (e.g., by executing software instructions), thus conserving processing cycles of CPUs 912 for operations associated with the workloads performed by the platform logic 910. Moreover, the dedicated logic for the manageability engine 926 may operate asynchronously with respect to the CPUs 912 and may gather at least some of the telemetry data without increasing the load on the CPUs.

A manageability engine 926 may process telemetry data it collects (specific examples of the processing of stress information will be provided herein). In various embodiments, manageability engine 926 reports the data it collects and/or the results of its processing to other elements in the computer system, such as one or more hypervisors 920 or other operating systems and/or system management software (which may run on any suitable logic such as system management platform 906). In particular embodiments, a critical event such as a core that has accumulated an excessive amount of stress may be reported prior to the normal interval for reporting telemetry data (e.g., a notification may be sent immediately upon detection).

Additionally, manageability engine 926 may include programmable code configurable to set which CPU(s) 912 a particular chipset 916 will manage and/or which telemetry data will be collected.

Chipsets 916 also each include a communication interface 928. Communication interface 928 may be used for the communication of signaling and/or data between chipset 916 and one or more I/O devices, one or more networks 908, and/or one or more devices coupled to network 908 (e.g., system management platform 906). For example, communication interface 928 may be used to send and receive network traffic such as data packets. In a particular embodiment, a communication interface 928 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 916 (e.g., manageability engine 926 or switch 930) and another device coupled to network 908. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 928 may allow communication of data (e.g., between the manageability engine 926 and the data center management platform 906) associated with management and monitoring functions performed by manageability engine 926. In various embodiments, manageability engine 926 may utilize elements (e.g., one or more NICs) of communication interfaces 928 to report the telemetry data (e.g., to system management platform 906) in order to reserve usage of NICs of communication interface 918 for operations associated with workloads performed by platform logic 910.

Switches 930 may couple to various ports (e.g., provided by NICs) of communication interface 928 and may switch data between these ports and various components of chipset 916 (e.g., one or more Peripheral Component Interconnect Express (PCIe) lanes coupled to CPUs 912). Switches 930 may be a physical or virtual (i.e., software) switch.

Platform logic 910 may include an additional communication interface 918. Similar to communication interfaces 928, communication interfaces 918 may be used for the communication of signaling and/or data between platform logic 910 and one or more networks 908 and one or more devices coupled to the network 908. For example, communication interface 918 may be used to send and receive network traffic such as data packets. In a particular embodiment, communication interfaces 918 comprise one or more physical NICs. These NICs may enable communication between any suitable element of platform logic 910 (e.g., CPUs 912 or memory 914) and another device coupled to network 908 (e.g., elements of other platforms or remote computing devices coupled to network 908 through one or more networks).

Platform logic 910 may receive and perform any suitable types of workloads. A workload may include any request to utilize one or more resources of platform logic 910, such as one or more cores or associated logic. For example, a workload may comprise a request to instantiate a software component, such as an I/O device driver 924 or guest system 922; a request to process a network packet received from a virtual machine 932 or device external to platform 902A (such as a network node coupled to network 908); a request to execute a process or thread associated with a guest system 922, an application running on platform 902A, a hypervisor 920 or other operating system running on platform 902A; or other suitable processing request.

A virtual machine 932 may emulate a computer system with its own dedicated hardware. A virtual machine 932 may run a guest operating system on top of the hypervisor 920. The components of platform logic 910 (e.g., CPUs 912, memory 914, chipset 916, and communication interface 918) may be virtualized such that it appears to the guest operating system that the virtual machine 932 has its own dedicated components.

A virtual machine 932 may include a virtualized NIC (vNIC), which is used by the virtual machine as its network interface. A vNIC may be assigned a media access control (MAC) address or other identifier, thus allowing multiple virtual machines 932 to be individually addressable in a network.

VNF 934 may comprise a software implementation of a functional building block with defined interfaces and behavior that can be deployed in a virtualized infrastructure. In particular embodiments, a VNF 934 may include one or more virtual machines 932 that collectively provide specific functionalities (e.g., WAN optimization, VPN termination, firewall operations, load-balancing operations, security functions, etc.). A VNF 934 running on platform logic 910 may provide the same functionality as traditional network components implemented through dedicated hardware. For example, a VNF 934 may include components to perform any suitable NFV workloads, such as virtualized evolved packet core (vEPC) components, mobility management entities (MMEs), 3rd Generation Partnership Project (3GPP) control and data plane components, etc.

SFC 936 is a group of VNFs 934 organized as a chain to perform a series of operations, such as network packet processing operations. Service function chaining may provide the ability to define an ordered list of network services (e.g., firewalls and load balancers) that are stitched together in the network to create a service chain.

A hypervisor 920 (also known as a virtual machine monitor) may comprise logic to create and run guest systems 922. The hypervisor 920 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 910. Services of hypervisor 920 may be provided by virtualizing in software or through hardware assisted resources that require minimal software intervention, or both. Multiple instances of a variety of guest operating systems may be managed by the hypervisor 920. Each platform 902 may have a separate instantiation of a hypervisor 920.

Hypervisor 920 may be a native or bare-metal hypervisor that runs directly on platform logic 910 to control the platform logic and manage the guest operating systems. Alternatively, hypervisor 920 may be a hosted hypervisor that runs on a host operating system and abstracts the guest operating systems from the host operating system. Hypervisor 920 may include a virtual switch 938 that may provide virtual switching and/or routing functions to virtual machines of guest systems 922. The virtual switch 938 may comprise a logical switching fabric that couples the vNICs of the virtual machines 932 to each other, thus creating a virtual network through which virtual machines may communicate with each other.

Virtual switch 938 may comprise a software element that is executed using components of platform logic 910. In various embodiments, hypervisor 920 may be in communication with any suitable entity (e.g., a SDN controller) which may cause hypervisor 920 to reconfigure the parameters of virtual switch 938 in response to changing conditions in platform 902 (e.g., the addition or deletion of virtual machines 932 or identification of optimizations that may be made to enhance performance of the platform).

Hypervisor 920 may also include resource allocation logic 944, which may include logic for determining allocation of platform resources based on the telemetry data (which may include stress information). Resource allocation logic 944 may also include logic for communicating with various components of platform logic 910 entities of platform 902A to implement such optimization, such as components of platform logic 910.

Any suitable logic may make one or more of these optimization decisions. For example, system management platform 906; resource allocation logic 944 of hypervisor 920 or other operating system; or other logic of computer platform 902A may be capable of making such decisions. In various embodiments, the system management platform 906 may receive telemetry data from and manage workload placement across multiple platforms 902. The system management platform 906 may communicate with hypervisors 920 (e.g., in an out-of-band manner) or other operating systems of the various platforms 902 to implement workload placements directed by the system management platform.

The elements of platform logic 910 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 902A may be coupled together in any suitable manner such as through one or more networks 908. A network 908 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 10:
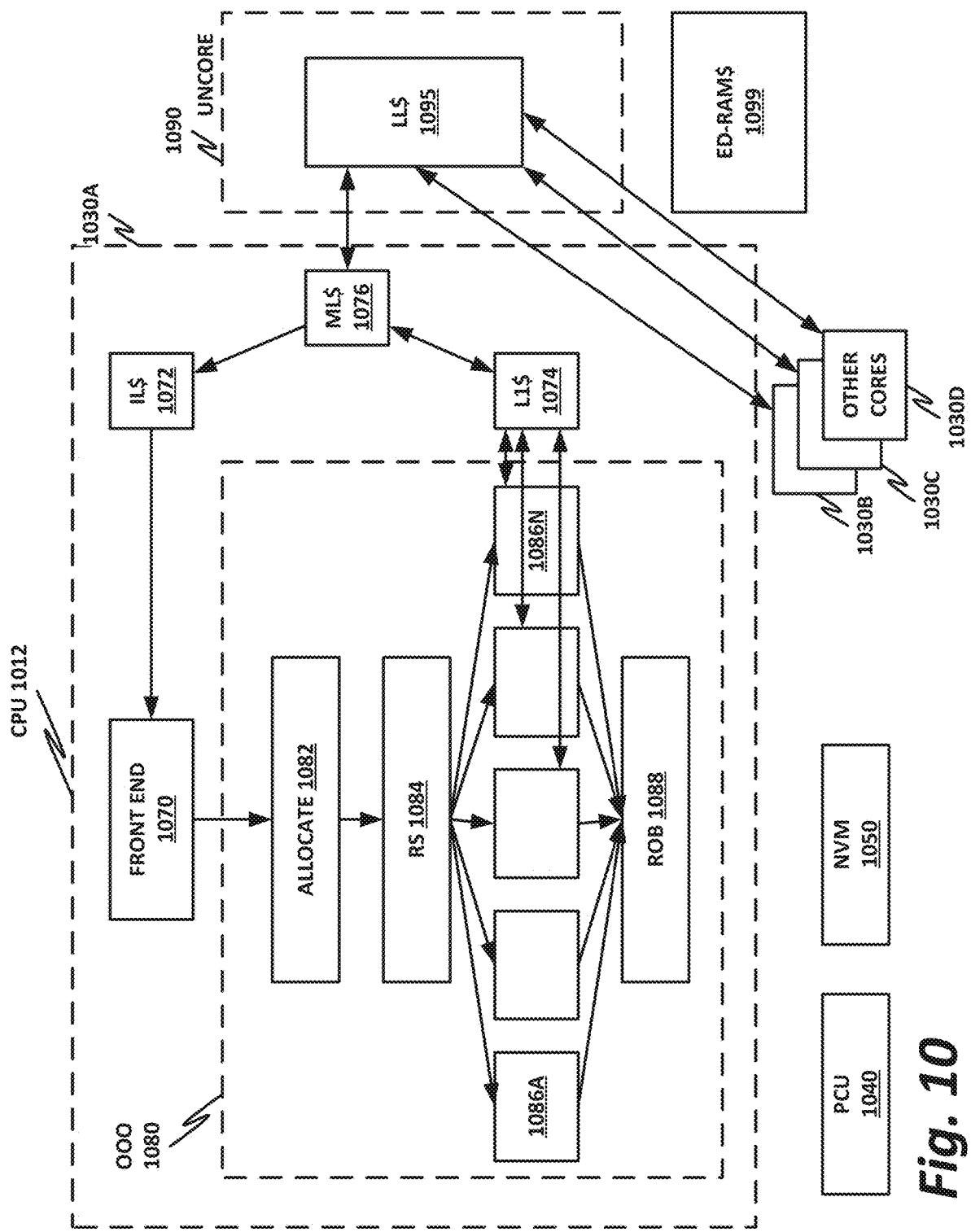
FIG. 10 is a block diagram of a central processing unit (CPU).

FIG. 10 illustrates a block diagram of a central processing unit (CPU) 1012. Embodiments of CPU 1012 disclosed herein may be adapted or configured to provide the method of cryptojacking detection according to the teachings of the present specification. Although CPU 1012 depicts a particular configuration, the cores and other components of CPU 1012 may be arranged in any suitable manner. CPU 1012 may comprise any processor or processing device, such as a microprocessor, an embedded processor, a digital signal processor (DSP), a network processor, an application processor, a co-processor, a system-on-a-chip (SoC), or other device to execute code. CPU 1012, in the depicted embodiment, includes four processing elements (cores 1030 in the depicted embodiment), which may include asymmetric processing elements or symmetric processing elements. However, CPU 1012 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1030A includes an out-of-order processor that has a front end unit 1070 used to fetch incoming instructions, perform various processing (e.g., caching, decoding, branch predicting, etc.) and passing instructions/operations along to an out-of-order (OOO) engine. The OOO engine performs further processing on decoded instructions.

A front end 1070 may include a decode module coupled to fetch logic to decode fetched elements. Fetch logic, in one embodiment, includes individual sequencers associated with thread slots of cores 1030. Usually, a core 1030 is associated with a first ISA, which defines/specifies instructions executable on core 1030. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1030, in one embodiment, recognize the same ISA (or a subset thereof). Alternatively, in a heterogeneous core environment, a decoder of one or more cores (e.g., core 1030B) may recognize a second ISA (either a subset of the first ISA or a distinct ISA).

In the embodiment depicted, the OOO engine includes an allocate unit 1082 to receive decoded instructions, which may be in the form of one or more micro-instructions or µops, from front end unit 1070, and allocate them to appropriate resources such as registers and so forth. Next, the instructions are provided to a reservation station 1084, which reserves resources and schedules them for execution on one of a plurality of execution units 1086A-1086N. Various types of execution units may be present, including, for example, arithmetic logic units (ALUs), load and store units, vector processing units (VPUs), and floating point execution units, among others. Results from these different execution units are provided to a reorder buffer (ROB) 1088, which take unordered results and return them to correct program order.

In the embodiment depicted, both front end unit 1070 and OOO engine 1080 are coupled to different levels of a memory hierarchy. Specifically shown is an instruction level cache 1072, that in turn couples to a mid-level cache 1076, that in turn couples to a last level cache 1095. In one embodiment, last level cache 1095 is implemented in an on-chip (sometimes referred to as uncore) unit 1090. Uncore 1090 may communicate with system memory 1099, which, in the illustrated embodiment, is implemented via embedded DRAM (eDRAM). The various execution units 1086 within OOO engine 1080 are in communication with a first level cache 1074 that also is in communication with mid-level cache 1076. Additional cores 1030B-1030D may couple to last level cache 1095 as well.

In particular embodiments, uncore 1090 may be in a voltage domain and/or a frequency domain that is separate from voltage domains and/or frequency domains of the cores. That is, uncore 1090 may be powered by a supply voltage that is different from the supply voltages used to power the cores and/or may operate at a frequency that is different from the operating frequencies of the cores.

CPU 1012 may also include a power control unit (PCU) 1040. In various embodiments, PCU 1040 may control the supply voltages and the operating frequencies applied to each of the cores (on a per-core basis) and to the uncore. PCU 1040 may also instruct a core or uncore to enter an idle state (where no voltage and clock are supplied) when not performing a workload.

In various embodiments, PCU 1040 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1040 may detect stress characteristics at any suitable interval.

In various embodiments, PCU 1040 is a component that is discrete from the cores 1030. In particular embodiments, PCU 1040 runs at a clock frequency that is different from the clock frequencies used by cores 1030. In some embodiments where the PCU is a microcontroller, PCU 1040 executes instructions according to an ISA that is different from an ISA used by cores 1030.

In various embodiments, CPU 1012 may also include a nonvolatile memory 1050 to store stress information (such as stress characteristics, incremental stress values, accumulated stress values, stress accumulation rates, or other stress information) associated with cores 1030 or uncore 1090, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including central processing unit (CPU) package. An SoC represents an integrated circuit (IC) that integrates components of a computer or other electronic system into a single chip. Thus, for example, client devices 710 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 810, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 850 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 820 and storage 850, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 810 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator).

In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

Example 1 includes a computing apparatus, comprising: a processor; and logic encoded into one or more computer-readable mediums, the logic to instruct the processor to: capture first data from an intermediate data source across a first temporal interval; perform partial signal processing on the first data to classify the first temporal interval as either suspicious or not suspicious, wherein the first temporal interval is classified as suspicious if it is determined to potentially represent at least a portion of a cryptomining operation; classify second through N temporal intervals as either suspicious or not suspicious; based on the first through N temporal intervals, classify the apparatus as either operating a cryptomining function or not; and upon classifying the apparatus as operating a cryptomining function and determining that the cryptomining function is not authorized, take remedial action on the apparatus.

Example 2 includes the computing apparatus of example 1, wherein the logic is further to instruct the processor to compute a confidence score for the classification of the apparatus.

Example 3 includes the computing apparatus of example 2, wherein the confidence score is based at least in part on detecting suspicious behavior in one of the first through N intervals, and observing that the same or different suspicious behavior occurs in another one of the first through N intervals.

Example 4 includes the computing apparatus of example 2, wherein the confidence score is based at least in part on dynamic disassembly of code operating during the first through N intervals, wherein the dynamic disassembly identifies instruction sequences characteristic of cryptomining.

Example 5 includes the computing apparatus of example 1, wherein the first through N intervals are of substantially uniform length.

Example 6 includes the computing apparatus of example 5, wherein the uniform length is approximately 10 seconds.

Example 7 includes the computing apparatus of example 1, wherein N=6.

Example 8 includes the computing apparatus of example 1, wherein the first through N intervals are of a substantially uniform length of approximately 10 seconds, whereby the first through N intervals represent a window of approximately 60 seconds.

Example 9 includes the computing apparatus of example 1, wherein capturing the first data from the intermediate data source comprises capturing system performance data.

Example 10 includes the computing apparatus of example 9, wherein the system performance data comprise CPU and/or memory utilization data.

Example 11 includes the computing apparatus of example 9, further comprising a network interface, and wherein the system performance data comprise network utilization data.

Example 12 includes the computing apparatus of example 1, wherein classifying an interval as suspicious comprises determining that the interval represents a possible cryptomining stratum initialization frame or stratum block report frame.

Example 13 includes the computing apparatus of example 1, wherein classifying the apparatus as operating a cryptomining function comprises identifying at least one of a potential stratum initialization frame, a potential stratum block report, or a potential proof of work report, in conjunction with high CPU and/or memory utilization.

Example 14 includes one or more tangible, non-transitory computer-readable storage mediums having stored thereon instructions to: during first through N temporal intervals, collect data from intermediate data sources; perform partial signal processing on the data of the first through N intervals to individually classify the intervals as either suspicious or not suspicious, wherein an interval is classified as suspicious if it is determined to potentially represent at least a portion of a cryptomining operation; based on the first through N temporal intervals, classify the apparatus as either operating a cryptomining function or not; and upon classifying the apparatus as operating a cryptomining function and determining that the cryptomining function is not authorized, take remedial action on the apparatus.

Example 15 includes the one or more tangible, non-transitory computer-readable mediums of example 14, wherein the instructions are further to compute a confidence score for the classification of the apparatus.

Example 16 includes the one or more tangible, non-transitory computer-readable mediums of example 15, wherein the confidence score is based at least in part on detecting suspicious behavior in one of the first through N intervals, and observing that the same or different suspicious behavior occurs in another one of the first through N intervals.

Example 17 includes the one or more tangible, non-transitory computer-readable mediums of example 15, wherein the confidence score is based at least in part on dynamic disassembly of code operating during the first through N intervals, wherein the dynamic disassembly identifies instruction sequences characteristic of cryptomining.

Example 18 includes the one or more tangible, non-transitory computer-readable mediums of example 14, wherein the first through N intervals are of substantially uniform length.

Example 19 includes the one or more tangible, non-transitory computer-readable mediums of example 18, wherein the uniform length is approximately 10 seconds.

Example 20 includes the one or more tangible, non-transitory computer-readable mediums of example 14, wherein N=6.

Example 21 includes the one or more tangible, non-transitory computer-readable mediums of example 14, wherein the first through N intervals are of a substantially uniform length of approximately 10 seconds, whereby the first through N intervals represent a window of approximately 60 seconds.

Example 22 includes the one or more tangible, non-transitory computer-readable mediums of example 14, wherein capturing the first data from the intermediate data source comprises capturing system performance data.

Example 23 includes the one or more tangible, non-transitory computer-readable mediums of example 22, wherein the system performance data comprise CPU and/or memory utilization data.

Example 24 includes the one or more tangible, non-transitory computer-readable mediums of example 22, wherein the system performance data comprise network utilization data.

Example 25 includes the one or more tangible, non-transitory computer-readable mediums of example 14, wherein classifying an interval as suspicious comprises determining that the interval represents a possible cryptomining stratum initialization frame or stratum block report frame.

Example 26 includes the one or more tangible, non-transitory computer-readable mediums of example 14, wherein classifying the apparatus as operating a cryptomining function comprises identifying at least one of a potential stratum initialization frame, a potential stratum block report, or a potential proof of work report, in conjunction with high CPU and/or memory utilization.

Example 27 includes a method of detecting a cryptojacking attack on a computing apparatus, comprising: during first through N temporal intervals, collecting utilization data from one or more data sources; performing partial signal processing on the data of the first through N intervals to individually classify the intervals as either suspicious or not suspicious, wherein an interval is classified as suspicious if it is determined to potentially represent at least a portion of a cryptomining operation; based on the first through N temporal intervals, classifying the apparatus as either operating a cryptomining function or not; and upon classifying the apparatus as operating a cryptomining function and determining that the cryptomining function is not authorized, performing a remedial action for the apparatus.

Example 28 includes the method of example 27, further comprising computing a confidence score for the classification of the apparatus.

Example 29 includes the method of example 28, wherein the confidence score is based at least in part on detecting suspicious behavior in one of the first through N intervals, and observing that the same or different suspicious behavior occurs in another one of the first through N intervals.

Example 30 includes the method of example 28, wherein the confidence score is based at least in part on dynamic disassembly of code operating during the first through N intervals, wherein the dynamic disassembly identifies instruction sequences characteristic of cryptomining.

Example 31 includes the method of example 27, wherein the first through N intervals are of substantially uniform length.

Example 32 includes the method of example 31, wherein the uniform length is approximately 10 seconds.

Example 33 includes the method of example 27, wherein N=6.

Example 34 includes the method of example 27, wherein the first through N intervals are of a substantially uniform length of approximately 10 seconds, whereby the first through N intervals represent a window of approximately 60 seconds.

Example 35 includes the method of example 27, wherein capturing the first data from the intermediate data source comprises capturing system performance data.

Example 36 includes the method of example 35, wherein the system performance data comprise CPU and/or memory utilization data.

Example 37 includes the method of example 35, wherein the system performance data comprise network utilization data.

Example 38 includes the method of example 27, wherein classifying an interval as suspicious comprises determining that the interval represents a possible cryptomining stratum initialization frame or stratum block report frame.

Example 39 includes the method of example 27, wherein classifying the apparatus as operating a cryptomining function comprises identifying at least one of a potential stratum initialization frame, a potential stratum block report, or a potential proof of work report, in conjunction with high CPU and/or memory utilization.

Example 40 includes an apparatus comprising means for performing the method of any of examples 27-39.

Example 41 includes the apparatus of example 40, wherein the means for performing the method comprise a processor and a memory.

Example 42 includes the apparatus of example 41, wherein the memory comprises machine-readable instructions, that when executed cause the apparatus to perform the method of any of examples 27-39.

Example 43 includes the apparatus of any of examples 40-42, wherein the apparatus is a computing system.

Example 44 includes at least one computer-readable medium comprising instructions that, when executed, implement a method or realize an apparatus as illustrated in any of examples 27-43.

What is claimed is:

1. A computing apparatus, comprising:
   a hardware platform comprising a processor and a memory, including a nonvolatile memory; and
   instructions encoded within the memory to instruct the processor to:
      capture first data from an intermediate data source across first through N>1 temporal intervals;
      perform partial signal processing on the first data, comprising applying an audio processing algorithm to the first data to determine whether the first data represent a candidate cryptomining operation, and designating the first data as suspicious if the first data are determined, according to the audio processing algorithm, to represent a candidate cryptomining operation, and designating the first data as not suspicious if the first data are determined, according to the audio processing algorithm, to not represent a candidate cryptomining operation;
      classify second through N>1 temporal intervals as either suspicious or not suspicious;
      based on the first through N>1 temporal intervals, classify the apparatus as either operating a cryptomining function or not; and
      upon classifying the apparatus as operating a cryptomining function and determining that the cryptomining function is not authorized, take remedial action on the apparatus.

2. The computing apparatus of claim 1, wherein the instructions are further to instruct the processor to compute a confidence score for the classification of the apparatus.

3. The computing apparatus of claim 2, wherein the confidence score is based at least in part on detecting suspicious behavior in one of the first through N>1 intervals, and observing that a same or different suspicious behavior occurs in another one of the first through N>1 intervals.

4. The computing apparatus of claim 2, wherein the confidence score is based at least in part on dynamic disassembly of code operating during the first through N>1 intervals, wherein the dynamic disassembly of code identifies instruction sequences characteristic of cryptomining.

5. The computing apparatus of claim 1, wherein the first through N>1 intervals are of substantially uniform length.

6. The computing apparatus of claim 5, wherein the substantially uniform length is approximately 10 seconds.

7. The computing apparatus of claim 1, wherein N=6.

8. The computing apparatus of claim 1, wherein the first through N>1 intervals are of a substantially uniform length of approximately 10 seconds, whereby the first through N>1 intervals represent a window of approximately 60 seconds.

9. The computing apparatus of claim 1, wherein capturing the first data from the intermediate data source comprises capturing system performance data.

10. The computing apparatus of claim 9, wherein the system performance data comprise CPU and/or memory utilization data.

11. The computing apparatus of claim 9, further comprising a network interface, and wherein the system performance data comprise network utilization data.

12. The computing apparatus of claim 1, wherein classifying an interval as suspicious comprises determining that the interval represents a possible cryptomining stratum initialization frame or stratum block report frame.

13. The computing apparatus of claim 1, wherein classifying the apparatus as operating a cryptomining function comprises identifying at least one of a potential stratum initialization frame, a potential stratum block report, or a potential proof of work report, in conjunction with high CPU and/or memory utilization.

14. One or more tangible, non-transitory computer-readable storage mediums having stored thereon instructions to:
during first through N>1 temporal intervals, collect data from intermediate data sources;
perform partial signal processing on the data, comprising applying an audio processing algorithm to the data to determine whether the data represent a candidate cryptomining operation, and designating the data as suspicious if the data are determined, according to the audio processing algorithm, to represent a candidate cryptomining operation, and designating the data as not suspicious if the data are determined, according to the audio processing algorithm, to not represent a candidate cryptomining operation;
based on the first through N>1 temporal intervals, classify an apparatus as either operating a cryptomining function or not; and
upon classifying the apparatus as operating a cryptomining function and determining that the cryptomining function is not authorized, take remedial action on the apparatus.

15. The one or more tangible, non-transitory computer-readable mediums of claim 14, wherein the instructions are further to compute a confidence score for the classification of the apparatus.

16. The one or more tangible, non-transitory computer-readable mediums of claim 14, wherein the first through N>1 intervals are of substantially uniform length.

17. The one or more tangible, non-transitory computer-readable mediums of claim 14, wherein collecting the data from the intermediate data sources comprises capturing system performance data.

18. The one or more tangible, non-transitory computer-readable mediums of claim 17, wherein the system performance data comprise CPU data, memory utilization data, and/or network utilization data.

19. A method of detecting a cryptojacking attack on a computing apparatus, comprising:
during first through N>1 temporal intervals, collecting utilization data from one or more data sources;
performing partial signal processing on the data, comprising applying an audio processing algorithm to the data to determine whether the data represent a candidate cryptomining operation, and designating the data as suspicious if the data are determined, according to the partial signal processing, to represent a candidate cryptomining operation, and designating the data as not suspicious if the data are determined, according to the partial signal processing, to not represent a candidate cryptomining operation;
based on the first through N>1 temporal intervals, classifying the apparatus as either operating a cryptomining function or not; and
upon classifying the apparatus as operating a cryptomining function and determining that the cryptomining function is not authorized, performing a remedial action for the apparatus.

20. The method of claim 19, further comprising computing a confidence score for the classification of the apparatus.

* * * * *